US011466901B2

United States Patent
Acharya et al.

(10) Patent No.: US 11,466,901 B2
(45) Date of Patent: Oct. 11, 2022

(54) SELF POWERED AND TIMER BASED SOLAR PANEL CLEANING SYSTEM

(71) Applicant: WEISMACHER ECO PRIVATE LIMITED., Gujarat (IN)

(72) Inventors: Rajeshkumar Hariprasad Acharya, Gujarat (IN); Yusuf Nazmuddin Ghadiali, Gujarat (IN)

(73) Assignee: WEISMACHER ECO PRIVATE LIMITED, Ahmedabad (IN)

( * ) Notice: Subject to any disclaimer, the term of this patent is extended or adjusted under 35 U.S.C. 154(b) by 48 days.

(21) Appl. No.: 16/958,580

(22) PCT Filed: Dec. 27, 2018

(86) PCT No.: PCT/IN2018/050886
§ 371 (c)(1),
(2) Date: Jun. 26, 2020

(87) PCT Pub. No.: WO2019/130352
PCT Pub. Date: Jul. 4, 2019

(65) Prior Publication Data
US 2020/0355402 A1 Nov. 12, 2020

(30) Foreign Application Priority Data

Dec. 28, 2017 (IN) .............................. 201721047112
Apr. 28, 2018 (IN) .............................. 201821016142

(51) Int. Cl.
*F24S 40/20* (2018.01)
*B08B 1/04* (2006.01)
*H02S 40/10* (2014.01)

(52) U.S. Cl.
CPC ................ *F24S 40/20* (2018.05); *B08B 1/04* (2013.01); *H02S 40/10* (2014.12)

(58) Field of Classification Search
CPC . F24S 40/20; B08B 1/04; B08B 1/008; B08B 1/002; H02S 40/10; H02S 40/12;
(Continued)

(56) References Cited

U.S. PATENT DOCUMENTS

| 2013/0206173 A1* | 8/2013 | Zijlstra | ..................... B08B 1/00 134/6 |
| 2014/0150816 A1* | 6/2014 | Potter | ..................... F24S 40/20 15/1.51 |

(Continued)

FOREIGN PATENT DOCUMENTS

| CN | 105149253 | 6/2017 |
| CN | 105149253 B * | 6/2017 |

(Continued)

OTHER PUBLICATIONS

CN105149253B_Translated_Description (Year: 2022).*
(Continued)

*Primary Examiner* — Orlando E Aviles
*Assistant Examiner* — Jacob Adam Montgomery
(74) *Attorney, Agent, or Firm* — Cislo & Thomas, LLP

(57) ABSTRACT

The present invention relates to self powered and timer based solar panel cleaning system that is operated by self generating electrical power from solar energy and reduces wear and tear problem of moving parts. In this system, the microcontroller (54) is interfaced with motor driver (51) and brush driver (52). Said motor driver (51) and brush driver (52) control the speed of wheel motor (32) and brush driver (33). When ultrasonic sensor (5) sends signal to microcontroller (54), said microcontroller (54) generates and transmits signal to wheel motor driver (51) and brush driver (52). Thus, when structure reaches nearby the end edge of the solar panel array, said drivers gradually reduce r.p.m. of wheel motor (32) and brush motor (33) and then motors stop
(Continued)

when machine reaches to opposite platform. Thus, during alteration of mode, r.p.m. of motors will be at substantially low that prevents the moving parts from damage.

5 Claims, 5 Drawing Sheets

(58) Field of Classification Search
CPC . Y02E 10/40; Y02E 10/50; A47L 1/02; A47L 11/38; A47L 11/4002; A47L 11/4005; A47L 11/4011; A47L 9/08
USPC .......................................................... 15/21.1
See application file for complete search history.

(56) References Cited

U.S. PATENT DOCUMENTS

| | | | |
|---|---|---|---|
| 2017/0194898 A1* | 7/2017 | Meller | F24S 40/20 |
| 2017/0329347 A1* | 11/2017 | Passot | G05D 1/0274 |
| 2018/0087908 A1* | 3/2018 | Bailey | G01C 21/20 |
| 2018/0212558 A1* | 7/2018 | Meller | G05D 1/0225 |
| 2018/0241343 A1* | 8/2018 | Jiang | B08B 1/04 |
| 2019/0214940 A1* | 7/2019 | Allouche | B08B 7/02 |
| 2019/0245481 A1* | 8/2019 | Parrott | H02S 40/44 |

FOREIGN PATENT DOCUMENTS

| | | | | |
|---|---|---|---|---|
| DE | 102010025845 A1 | | 5/2011 | |
| EP | 2549199 A1 | * | 1/2013 | ................ F24J 2/40 |
| KR | 1417992 B1 | * | 8/2014 | ............ H02S 40/10 |
| TR | 201711064 A2 | * | 10/2017 | |

OTHER PUBLICATIONS

TR_201711064_Translated_Description (Year: 2022).*
PCT International Search Report and Written Opinion PCT/IN2018/050886 dated Apr. 11, 2019; 8 pages.

* cited by examiner

SELF POWERED AND TIMER BASED SOLAR PANEL CLEANING SYSTEM

The present invention is a combination of Provisional Patent Application No. 201721047112 Filed on Dec. 28, 2017 and Provisional Patent Application No. 201821016142 Filed on Apr. 28, 2018.

FIELD OF INVENTION

The present invention relates to a system for cleaning the surface of the solar panel array and more particularly, it relates to a self powered and timer based solar panel cleaning system that cleans the solar panel array on regular basis to maximize the lifetime and efficiency of a solar panel and that is operated by self-generating electric power without using domestic or commercial power supply and that substantially reduce the wear and tear problems in system operating motor-gears.

BACKGROUND OF INVENTION

World is endowed with abundant solar energy. Entire world receives about 5000 Trillion KWh/year, which is more than sufficient to satisfy the power requirement of the entire nation. With more than 300 million people without access to uninterrupted supply of electricity and industries citing energy shortage as key growth barrier in India, solar power has the potential to help the country address the shortage of power for economic growth.

Although solar energy is a very promising source since it supports delocalized power generation, it requires regular maintenance after installation. Accumulated dust on the surface of photovoltaic solar panel can reduce the system's efficiency up to 50%. This emphasizes the need to keep the surface of the solar panel as clean as possible. Most of the present cleaning methods employ water based techniques (e.g., washing directly from a water pump, a soap solution, etc.). One could not afford to waste copious amounts of water on cleaning solar panels since it cannot be recycled very easily for practical uses. Also standalone panels installed in different areas do not always have a nearby water source which further adds to the problem. Another efficient method of cleaning solar panels is using Electrostatic cleaning method. Though it is very effective, there is a decrease in power performance. Also every solar panel requires an individual electrostatic cleaner for permanent installations which makes cleaning laborious and expensive.

Photovoltaic panels are generally installed in relatively inaccessible areas like roofs or arid deserts which make manual cleaning operations difficult and expensive. Most solar panels are normally cleaned early in the morning or late at night since cleaning during its principal operation leads to non-uniform power outage and decrease in efficiency. Thus the lack of automation capabilities in most cleaning solutions proves costlier in terms of water and energy-use. Thus, by implementing the proposed design the need for water based cleaning methods, manual intervention and cleansing difficulties in remote places is eliminated.

Further, the conventional solar power cleaning systems are operated through any external domestic or commercial electric power supply. Further, in remote area, the electricity is not available at adequate extent. Hence, such kind of solar panel cleaning system is not feasible in such area. Further, in case of large number of solar panel array, the long electrical power supply cable is required that involves considerable structure complication, with corresponding increased technical and economical expenditure. Hence, they still leave some scope of improvements by eliminating the needs for any such external power sources.

Further, one more problem of conventional solar panel cleaning system is derived from the fact that, the ultrasonic sensors are utilized for sensing the edge of the solar panel array so that the system stops at the end of array. By the signals generated though the sensors, the system is altered in reverse and forward mode. In each mode, the motor runs the system at its peak level. In order to change the mode, the rotation of the motor gear turns into clockwise motion to antic clock wise and anti clock wise to clock wise. However, said transformation in rotating direction of the motor gear takes place rapidly along with the generation of signal by sensor. Due to that, the parts of the motor are damaged due to rapid wear and tear within short period of time. These facts involve frequent maintenance operations and replacement of parts.

The present invention, starting from the notion of the aforesaid problems, intends to provide a solution.

OBJECT OF INVENTION

The main object of the present invention is to provide a cleaning system for easily and efficiently cleaning the solar panel and which is free from above mentioned drawbacks.

Another object of the present invention is to provide a cleaning system for solar panel that is fully automatic and more economical.

Still another object of the present invention is to provide a self powered and timer based solar panel cleaning system for solar panel that will require minimal maintenance and supervision with low construction cost.

One more object of the present invention is to provide a self powered and timer based solar panel cleaning system for solar panel through which the difficulties associated with the water based cleaning methods, manual intervention and cleansing difficulties in remote places is eliminated.

One more object of the present invention is to provide a self powered and timer based solar panel that is operated by self generating power from solar energy.

One more object of the present invention is to provide a self powered and timer based solar panel that eliminates the requirement of domestic or commercial electric power source.

One more object of the present invention is to provide a self powered and timer based solar panel that is facilitated with configuration for reducing the r.p.m of the motor when the system is about to runs in alternate mode so that the wear and tear problems of the motor parts are substantially reduced.

STATEMENT OF THE INVENTION

A self powered and timer based solar panel cleaning system comprises a structure being supported through a plurality of driving wheels that bidirectionally carry said structure along the length of the solar panel row and in the width direction of the solar panel width during cleaning operation; said structure rest on platform located adjacent to an edge of a solar panel array and move towards the platform located at opposite edge of the solar panel array and vice-versa. Said structure having a plurality of cleaning brush being rotated during cleaning operation, a wheel drive motor for operating driving wheels for carrying said structure over solar panel array, a brush drive motor for rotational actuation of the cleaning brushes, a supporting wheel, solar panels located on the structure such that the maximum solar light impinge on the surface thereof, an operating unit for performing and controlling the operation of the wheel drive motor and the brush drive motor.

Said operating unit comprises a wheel motor driver and a brush motor driver that controls the speed of the wheel motor and the brush motor respectively, a timer wherein time for actuation of the cleaning operating and driving operation is defined, a microcontroller being signally communicated with ultrasonic sensor, batteries being charged by the solar panel, said wheel motor driver and the brush motor driver receive required supply from the battery, said timer and the microcontroller are operated by the power supply being supplied by the battery.

SUMMARY OF INVENTION

The present invention relates to self powered and timer based solar panel cleaning system that is operated by self generating electrical power from solar energy and reduces wear and tear problem of moving parts. The cleaning system according to present invention mainly comprises a structure being supported through driving wheels that carry said structure on the solar panel array during cleaning operation. Said structure is equipped with plurality of cleaning brush, at least one wheel motor for operating driving wheels, at least one brush motor for driving cleaning brushes, a supporting wheel, a motor control unit for controlling the speed of said wheel motor and the brush motor and a motor driver power supply unit for supplying power to a wheel motor driver and a brush motor driver.

Now, when the system is about to reach at the next platform (end of the solar panel array), the ultrasonic sensor sends signal to the microcontroller. According to this data, it generates and transmits the pulses to the wheel motor driver and brush motor driver. Thus, when the solar panel machine reaches nearby the end edge of the solar panel array, said drivers gradually reduce the r.p.m. of wheel motor and brush motor and then the motors stop when the machine reaches to the last edge of the solar panel array (platform). Then, mode of rotating direction of motor wheels is altered and then the system start running onto the solar panel in the same manner in reverse mode. Further, the r.p.m. of the motor are gradually increased when said system starts to run. Thus, the motor parts will not be damaged during the change in direction mode.

BRIEF DESCRIPTION OF DRAWINGS

Objects and advantages of the invention will be apparent from the following detailed description taken in conjunction with the accompanying figure of the drawing wherein.

DETAILED DESCRIPTION OF INVENTION

Before explaining the present invention in detail, it is to be understood that the invention is not limited in its application to the details of the construction and arrangement of parts illustrated in the accompanied drawings. The invention is capable of other embodiments, as depicted in different figures as described above and of being practiced or carried out in a variety of ways. It is to be understood that the phraseology and terminology employed herein is for the purpose of description and not of limitation.

Figure 1:
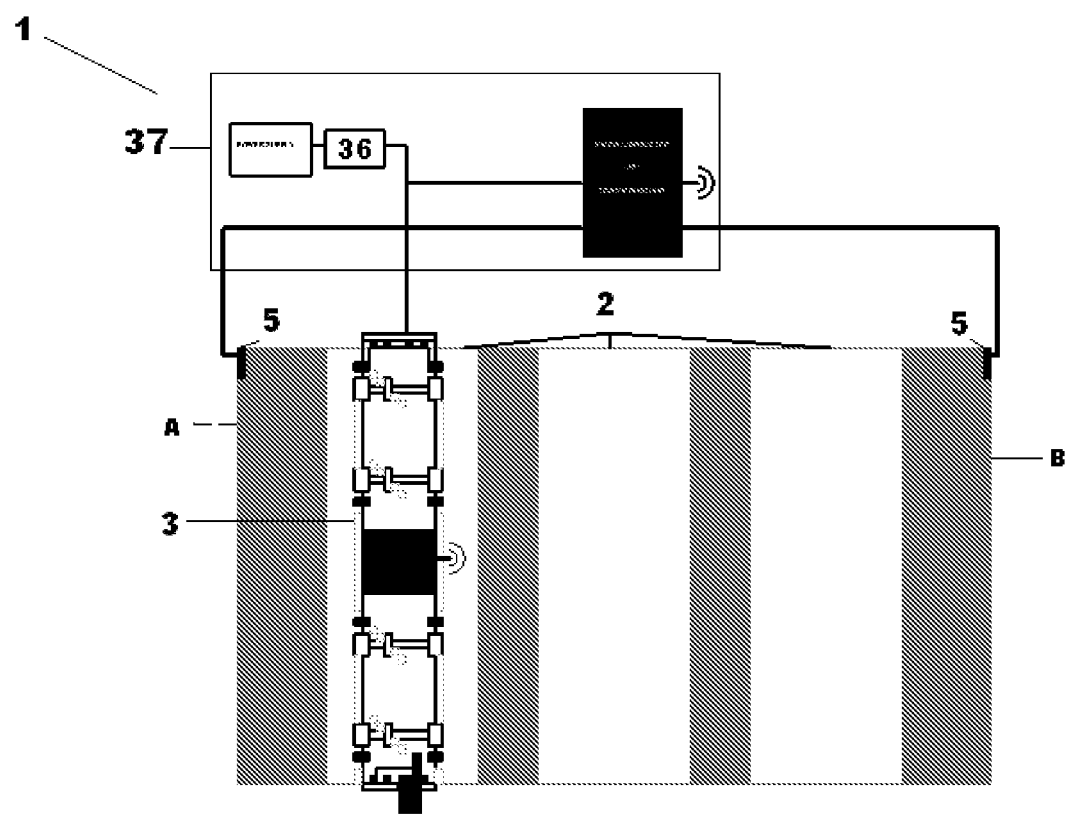
FIG. 1 illustrates a schematic view of the solar panel cleaning system according to present invention.

FIG. 1 illustrates the comprehensive view of the solar panel cleaning system according to present invention. The solar panel cleaning system, which is marked herein by reference numeral (1) (enumerated in FIGS. 1 and 2), operates on parallel rows of solar panels. The parallel rows of the solar panels, called herein solar panel array, are marked herein by reference numerals (2).

Figure 2:
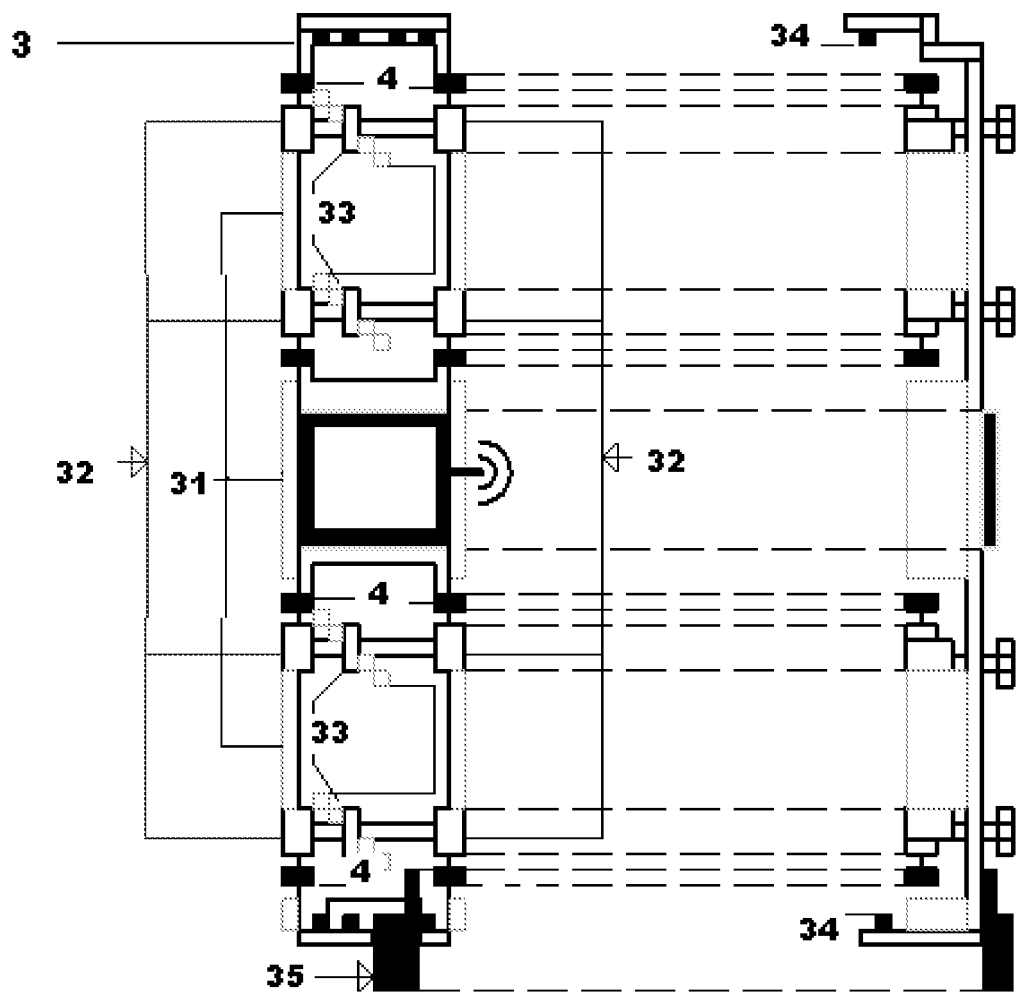
FIG. 2 illustrates a schematic view of the solar panel cleaning system according to present invention.

As shown in FIGS. 1 and 2, the solar panel cleaning system (1) according to present invention mainly comprises a structure (3) being supported through a plurality of driving wheels (4) that carry said structure (3) bidirectionally movable along the length of the solar panel row and in the width direction of the solar panel width during cleaning operation. Said structure (3) is equipped with plurality of cleaning brushes (31) being rotated during cleaning operation for removing dirt, debris and dust from the surface of the solar panels (2), a wheel drive motor (32) for operating driving wheels (2) for carrying said structure (3), a brush drive motor (33) for rotational actuation of the cleaning brushes (31), a supporting wheel (34), an operating unit (shown in FIG. 3) for performing movement of the structure (3) at pre-defined time interval and for driving the cleaning brushes (31) and the driving wheels (4) and for controlling the speed of said wheel motor (32) and the brush motor (33). The system of the present invention may also comprise a blower (35) for generating air stream to blow off the dirt, debris and dust.

Now as shown in FIG. 1, after performing cleaning operations of solar panel (2), the structure (3) will be rest on platform (A, B) located adjacent to the both end of the solar pane array, in non-operating condition so that area of the system do not occupy the surface of solar panel (2). At the middle of the rear and front elongated sides of the structure (3), a sensor (5), preferably but not limited to, ultrasonic sensor, is mounted. It is to be understood that in some embodiment, the sensor may be mounted on the platform (A, B) instead of the structure. In present invention, the system will rest on platform (A, B) in any circumstances after completing cleaning process.

Figure 3:
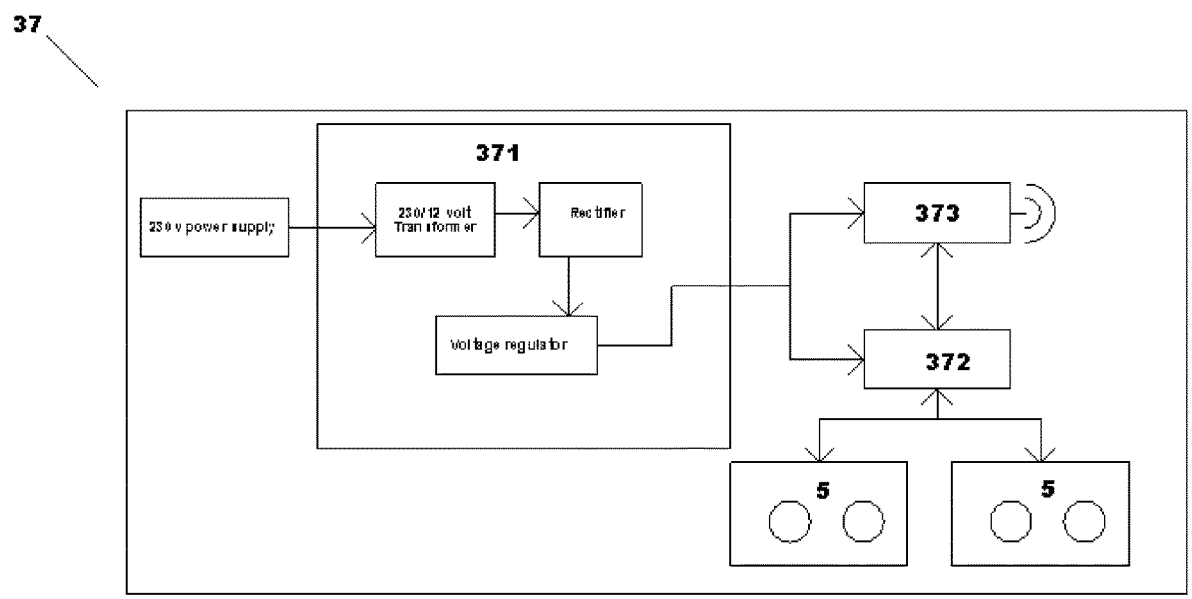
FIG. 3 illustrates a block diagram of control unit-I according to present invention.
Figure 4:
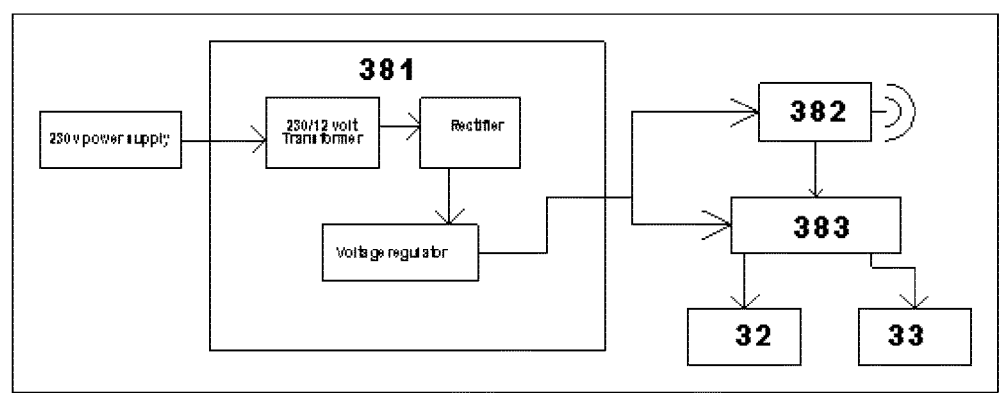
FIG. 4 illustrates a block diagram of control unit-II according to present invention.

Now, according to one embodiment of the present invention, said operating unit comprises a timer (36) (shown in FIG. 1) wherein time for actuation of the cleaning and driving operation is defined, a control unit-I (37) and a control unit-II (38) as shown in FIG. 3 and FIG. 4 respectively. Now, as shown in FIG. 3, said control unit-I (37) mainly comprising a SMPS (371) for generating regulated power supply (DC 12V), an Arduino UNO R3 microcontroller unit (372) connected in serial communication mode to reciprocally share data and operated through the power supply being supplied from the SMPS (371), said microcontroller (372) is configured to interface with the ultrasonic sensors (5) that detect the presence of the system by incident wave and reflected wave back from object and accordingly they transmit the signals to the microcontroller (372) to operate the driving wheels (4) into the forward and reverse direction. Said control unit-I (37) further comprises a RF transmitter (373) that transmits the pulse generated by the microcontroller (372) to the control unit-II (38) in the manner described below.

Now referring to FIG. 4, said control unit-II (38) comprises a SMPS (381) for generating regulated power supply (DC 12V), a RF receiver (382) for receiving pulse transmitted by the RF transmitter (372), a motor controlling unit (383) having a wheel motor driver and a brush motor driver for controlling the rotating direction of the motors according to the pulse received by the RF receiver (382).

In working of the cleaning system for solar panel according to present invention, initially the system will rest on the platform (A) or (B). The time for initiating the cleaning operation will be set into the timer (36). At pre-defined time, the timer (36) enables the power supply to provide the motor and brush driver and the micro-controller. Afterwards, said micro-controller operates the wheel motor (32) through motor driver. Said wheel motor (32) enables the driving wheels (4) to start moving on the surface of the solar panel (2). When the system is about to reach to the opposite platform, the ultrasonic sensor (5) will sense the system reaching on that platform. After sensing the presence of the system, the ultrasonic sensor (5) sends the signal to the micro controller (372). After analysis of the signal, the signal is wirelessly transmitted to the RF receiver (382) and then transmitted to the motor control unit (383). Said motor control unit (383) change the direction of the motors (32) and accordingly the driving wheels (4) also start to operate in reverse mode. Along with the movement of the driving wheels (4), the cleaning brushes (31) will also start to rotate to clean the solar panel (2). The signals of ultrasonic sensors (5) coming from different platforms are written into the microcontroller (372) and accordingly the system travels on forward and reverse direction. It is to be noted that said brushes may also be stationary rather than rotating. Further, after particular time, the timer (36) will cut off the power supply to the system so that the system will stop working after cleaning the solar panel (2).

Figure 5:
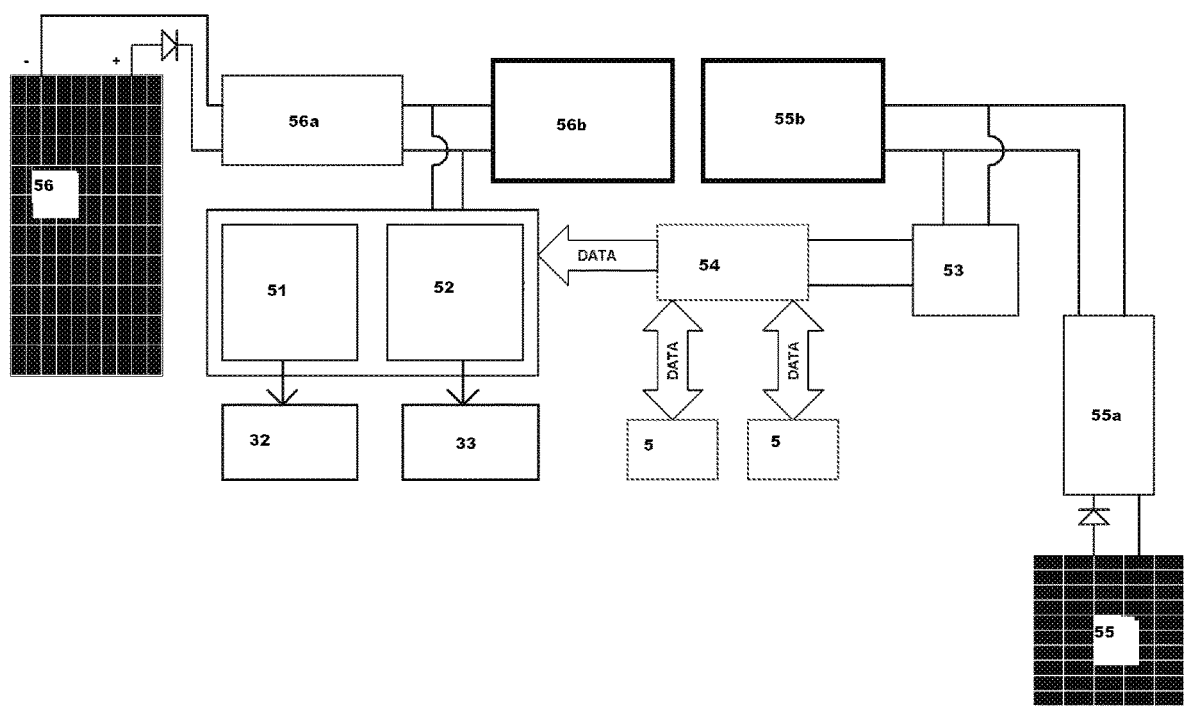
FIG. 5 illustrates a block diagram of control system according to another embodiment of the present invention.

According to another embodiment of the solar panel cleaning system, additionally said structure is equipped with solar panel (55, 56) (shown in FIG. 5) on upper surface thereof such that maximum solar light impinge on the surface of these solar panels (55, 56). Thus, the entire system will be operated on the solar energy through said solar panel (55, 56). It is to be understood that the numbers of solar panel (55, 56) shown in FIG. 5 are for the sake of understanding only. It is within the scope of present invention to utilize one or any numbers of solar panel as per requirement. According to this embodiment, the configuration of operating unit is shown in FIG. 5.

Referring to FIG. 5, said operating unit comprises a motor driver (51) and a brush driver (52) that control the speed of the wheel motor (32) and the brush motor (33) respectively. Said operating unit also comprises a timer (53) and a micro-controller (54). In present embodiment, said timer (53) and the micro controller (54) gets electric supply from the solar panel (55) through a solar charge controller (55a). Likewise, the wheel motor driver (51) and the brush motor driver (52) receive required supply from the solar panel (56) through a solar charge controller (56a). Simultaneously, the power supply from the solar panel (55, 56) is stored into the battery (55b, 56b) respectively. Said solar panels (55, 56) keep charge the batteries (55b, 56b) through solar charge controller (55a, 56a). Likewise, the timer (53) and the microcontroller (54) are operated by the power supply being supplied by the battery (55b). Said batteries (55b, 56b) are also charged by solar energy through the solar panel by solar charge controller (55a, 56a). Said solar controllers (55a, 56a) are employed for the sake of safety that prevent the damages in battery from the over charging.

In working of the cleaning system for solar panel according to second embodiment as shown in FIG. 5, initially the system will rest on the platform (A) or (B). When the timer (53) is actuated for pre-define time interval, it enable the power supply from solar operated battery (55b) to provide to the micro-controller (54). Said microcontroller (54) sends signal to the wheel motor driver (51) and the brush motor driver (52). After that, said motor driver (51) and the brush driver (52) actuate the wheel motor (32) and the brush motor (33) respectively by providing power supply from the solar operated battery (56b). Thus, the system starts to run from platform A to platform B and simultaneously clean the solar panel arrays with the help of the rotation of brushes (31). Initially, the motor (32, 33) will be started at low r.p.m. Then, gradually, the r.p.m. of the motor (32, 33) will be increased. Now, when said system is about to reach at the platform B, said ultrasonic sensor (5) sends signal to the microcontroller (54). When, said microcontroller (54) receives signal, it sends command to wheel motor driver (51) and brush motor driver (52) and accordingly, said drivers will reduce the r.p.m. of the wheel motor (32) and the brush motor (33). Thus, when the system will reach at opposite end of the solar panel array, the r.p.m. of the wheel motor (32) and brush motor (33) will be approximate at Zero. Then, the system will be operated in reverse mode and will run in the manner as described above (From platform B to A). During the translation of the system according to present invention on the solar panel array, the wearing parts of the motor (32, 33) will not be damaged during change in rotating direction due to avoidance of jerk experience during sudden changes in rotating direction of the motors. The back and forth movements of the system from platform A to B and platform B to A are defined in the microcontroller. After completion of defined round from platform A to B and platform B to A, said micro-controller stops the functions of the motors (32, 33). Then, after particular time, the timer (53) will cut off the power supply to the system so that the system will stop working after cleaning the solar panel.

Further, said structure (1) is also equipped with an emergency stop button for keeping the structure moving from platform A to platform B and vice versa in case of failure of ultrasonic sensor or any other failure situation. For that, an arrangement of vertical member is provided on the platform (A) and (B). Said emergency stop buttons are located on the body of structure (1) in such a way that when structure (3) reaches to the plate, said stop button gets pressed by said vertical member if sensor doesn't send signal and then it moves in opposite direction. Thus, the system will work in case of failure of sensor. Further, the brushes are also provided on the platform (A) and (B) for cleaning the surface of the solar panel (55, 56). Said solar panel (55, 56) will get automatically cleaned through these brushes during translation of the structure between platforms (A, B).

The invention has been explained in relation to specific embodiment. It is inferred that the foregoing description is only illustrative of the present invention and it is not intended that the invention be limited or restrictive thereto. Many other specific embodiments of the present invention will be apparent to one skilled in the art from the foregoing disclosure. All substitution, alterations and modification of the present invention which come within the scope of the following claims are to which the present invention is readily susceptible without departing from the spirit of the invention. The scope of the invention should therefore be determined not with reference to the above description but should be determined with reference to appended claims along with full scope of equivalents to which such claims are entitled.

REFERENCE NUMERALS LIST

Solar Panel Cleaning System (1)
Solar Panel (2)
Structure (3)
Cleaning brush (31)
Wheel drive motor (32)
Brush drive motor (33)
Supporting wheel (34)
Blower (35)
Timer (36)
Control unit-I (37)
SMPS (371)
R3 microcontroller unit (372)
RF transmitter (373)
Control unit-II (38)
SMPS (381)
RF receiver (382)
Motor controlling unit (383)
Motor driver (51)
Brush driver (52)
Timer (53)
Micro-controller (54)
Solar panel (55, 56)
Solar charge controller (55a, 56a)
Battery (55b, 56b)
Wheels (4)
Ultrasonic sensor (5)

We claim:

1. A self-powered and timer based solar panel cleaning system comprising a structure (3) being supported through a plurality of driving wheels (4) that bidirectionally carry said structure (3) along a length of a solar panel row and in a width direction of a solar panel width during a cleaning operation; said structure (3) resting on a first platform located adjacent to an edge of a solar panel array (2) and moving towards a second platform located at an opposite edge of the solar panel array (2) and vice-versa;

said structure (3) having a plurality of cleaning brushes (31) being rotated during the cleaning operation, a wheel drive motor (32) for operating the driving wheels (4) for carrying said structure (3) over the solar panel array (2), a brush drive motor (33) for rotational actuation of the cleaning brushes (31), a supporting wheel (34), solar panels (55, 56) located on the structure such that maximum solar light impinges on a surface thereof, an operating unit for performing and controlling the operation of the wheel drive motor (32) and the brush drive motor (33);

characterized in that, said operating unit comprises a wheel motor driver (51) and a brush motor driver (52) that controls the speed of the wheel drive motor (32) and the brush drive motor (33) respectively, a first timer (53) wherein a time for actuation of the cleaning operating and driving operation is defined, a microcontroller (54) being signally communicated with an ultrasonic sensor (5), the microcontroller (54) controlling the wheel drive motor (32) and the brush drive motor (33), so that, when said structure reaches the edges of the solar panel array (2), on the basis of signals from the ultrasonic sensor (5), the r.p.m. of the wheel drive motor (32) and the brush drive motor (33) are gradually reduced and after altering the mode of direction, the r.p.m. are gradually increased; batteries (55b, 56b) being charged by the solar panel (55, 56), said wheel motor driver (51) and the brush motor driver (52) receive required power supply from the battery (56b), said first timer (53) and the microcontroller (54) are operated by the power supply being supplied by the battery (55b);

wherein said operating unit includes a second timer (36), a control unit-I (37) and a control unit-II (38); and wherein said control unit-I has an SMPS [Switch mode Power Supply] (371) for generating regulated power (DC 12V), a microcontroller unit (372) connected in serial communication mode to reciprocally share data and operate from power being supplied from the SMPS (371), said microcontroller unit (372) is configured to interface with the ultrasonic sensors (5) and an RF transmitter (373) that transmits the pulse generated by the microcontroller unit (372) to the control unit-II.

2. The self-powered and timer based solar panel cleaning system as claimed in claim 1, wherein the power from the solar panel (55, 56) is supplied to the batteries (55b, 56b) through the solar charge controller (55a, 56a) respectively.

3. The self-powered and timer based solar panel cleaning system as claimed in claim 1, wherein said control unit-II has an SMPS [Switch Mode Power Supply] (381) for generating regulated power (DC 12V), an RF receiver (382) for receiving a pulse transmitted by the RF transmitter (373), a motor controlling unit (383) for controlling the rotating direction of the wheel drive motors (32).

4. The self-powered and timer based solar panel cleaning system as claimed in claim 1, wherein said structure (1) is equipped with an emergency stop button.

5. The self-powered and timer based solar panel cleaning system as claimed in claim 1, wherein said structure (1) is equipped a blower (35).

* * * * *